United States Patent [19]

Fluegge et al.

[11] Patent Number: 5,583,797

[45] Date of Patent: Dec. 10, 1996

[54] METHOD AND APPARATUS FOR WHEEL ALIGNMENT AUDIT

[75] Inventors: Jerry H. Fluegge, Manitou Beach; Prem R. Kumar, Ann Arbor; Erich Mau, Farmington Hills; Michael C. Mazzella, Fraser, all of Mich.

[73] Assignee: Ford Motor Company, Dearborn, Mich.

[21] Appl. No.: 333,918

[22] Filed: Nov. 3, 1994

[51] Int. Cl.⁶ .................................................. G06F 17/60
[52] U.S. Cl. ............................................ 364/552; 364/554
[58] Field of Search ................................. 364/552, 554, 364/551.01, 559, 560, 561; 356/155, 139.09; 33/203.18, 203.13, 203.12, 203.17, 203.15, 203.21; 348/94, 95; 29/273

[56] References Cited

U.S. PATENT DOCUMENTS

| | | | |
|---|---|---|---|
| 4,691,443 | 9/1987 | Hamilton et al. | 33/288 |
| 4,719,586 | 1/1988 | Moyer et al. | 364/552 |
| 4,745,469 | 5/1988 | Waldecker et al. | 358/93 |
| 4,811,250 | 3/1989 | Steber et al. | 364/551 |
| 4,855,897 | 8/1989 | Shinskey | 364/554 |
| 4,856,199 | 8/1989 | Merrill et al. | 33/263.17 |
| 4,899,218 | 2/1990 | Waldecker et al. | 358/93 |
| 5,047,947 | 9/1991 | Stump | 364/554 |
| 5,150,515 | 9/1992 | Merrill et al. | 33/203.12 |
| 5,177,558 | 1/1993 | Hill | 356/155 |
| 5,207,002 | 5/1993 | Humblet | 33/288 |
| 5,285,397 | 2/1994 | Heier et al. | 364/559 |
| 5,311,759 | 5/1994 | Mangrulkar et al. | 364/552 |
| 5,388,057 | 2/1995 | January | 364/551.01 |
| 5,440,478 | 8/1995 | Fisher et al. | 364/552 |

*Primary Examiner*—James P. Trammell
*Attorney, Agent, or Firm*—Gregory P. Brown; Roger L. May

[57] ABSTRACT

A method and apparatus for auditing motor vehicle wheel alignment includes a sensor for passively detecting physical cartesian relationships of at least one wheel on each motor vehicle, and a test station positioned for serially addressing each of the plurality of motor vehicles. A programmed computer control calculates measurements in response to representative signals from the sensors to identify the conditions of caster, camber and toe on the vehicle. A programmed analyzer for processing statistical process control techniques generates statistical data responsive to calculated measurements from the program computer control. Preferably, the test station is conveniently located along the production line for continuous but non-invasive detection of vehicle compliance with a predetermined level of standard deviation. Preferably, a feedback control responsive to the calculated measurements can adjust production fixture specifications or alignment settings when the analyzer identifies a threshold level of variation from the standard deviation. In the preferred embodiment, the test station has a tire rotator to adjust the sensed data for run-out.

16 Claims, 2 Drawing Sheets

METHOD AND APPARATUS FOR WHEEL ALIGNMENT AUDIT

TECHNICAL FIELD

The present invention relates generally to methods and apparatus for monitoring wheel alignment of a motor vehicle during assembly, and more particularly to such methods and apparatus for automated, non-invasive, passive monitoring of production units after final assembly for implementation of statistical processing control.

BACKGROUND ART

Wheel alignment is a well-known motor vehicle characteristic that has a substantial impact on handling and maneuverability of a motor vehicles. In particular, parameters of toe (toe-in, toe-out) caster and camber all must be within certain specifications in order to maintain accurate tracking and steerability of the vehicle without excessive tire wear. Unfortunately, systems for setting alignment as well as systems determining data for recording and analysis of alignment characteristics are often difficult and complicated to use. In addition, they do not permit audit testing for compliance of production line output with the production line standards for such characteristics. Moreover, many of the setting systems influence or affect the alignment and the results of the tests, and may therefore indicate a particular vehicle system is within tolerance although it is outside the allowable standards. Moreover, the existing measuring gauges do not permit an audit of every automobile passing through a production line, as the time and labor required permit only limited sampling of selected units in a production run.

To improve production quality and maintaining high compliance with a predetermined level of standard deviation, automotive companies have been forced to monitor only portions of production. For example, the previously known systems, for example, Hunter Model No. C-111 wheel alignment system, includes a device mechanically attached to each wheel to establish whether the caster, camber and toe-in are aligned within a predetermined tolerance range. Nevertheless, the requirement for installation of the devices on portions of the vehicles substantially slows the monitoring of the particular vehicle's alignment. As a result, the test procedure is limited to off-line testing of only a selected few of the vehicles run during a production period. Moreover, the previously known Hunter system is subject to the proper installation of the device by the machine operator. Moreover, the laborious and time-consuming nature of the test does not render it applicable to testing for each vehicle on the production line. As a result, while production may be running at 60–90 vehicles per hour, the Hunter monitoring is useful in monitoring only about 1 or 2 production units per hour.

Other recent attempts to monitor the quality of vehicles during production for wheel alignment parameters was in a desired tolerance level include an Anzen auditing machine called G-SWAT that aligns itself with the vehicle by means of a pantograph. A Fori measuring system has a pivoting hitch for addressing the motor vehicle. Nevertheless, it will still be understood that these systems, that are four or five times faster than the previously known Hunter system because they use automated engagement of the mechanical devices on vehicle wheels, still suffer disadvantages discussed for the baseline Hunter system. The mechanically contacting devices require a skilled operator to use, may interfere with the alignment being sensed, and do not match the speed of production.

Another improved apparatus for aligning vehicle wheels is disclosed in U.S. Pat. Nos. 4,745,469 and 4,899,218. The system avoids the need for physical contact with the vehicle by using sensors that are self-contained, intelligent machine vision camera and illumination systems that include a laser source projecting a plane of light onto the wheel structure. The camera is mounted at a perspective angle relative to the axis of the projected light plane to produce image signals representing the contour as viewed from the perspective angle. The camera does not require the sensor to be mounted for displacement relative to the wheel. The wheel position information can be combined with similarly measured data defining a vehicle centerline or other references so that the system generates a display on a video monitor to guide an operator in adjusting the wheel alignment. Nevertheless, the immediate video feedback to the worker aligning the vehicle or even an immediate printout of alignment settings does not provide a system for monitoring the statistical variation throughout the entire production line or permit the immediate feedback to on-line or off-line production stations involved in setting the wheel alignment.

SUMMARY OF THE PRESENT INVENTION

The present invention overcomes the above-mentioned disadvantages by providing an automated, passive monitoring system using non-contact sensors for determining measurable and calculable parameters and their compliance with a preset level of tolerable deviation at production line speed. The apparatus generally comprises a test station for serially addressing each of the production motor vehicles, a non-contact sensor for passively detecting physical cartesian relationships of the rotating wheel and generating the representative signal, a programmed computer control for calculating measurements from said representative signal and a programmed analyzer for processing statistical process control techniques to generate statistical data responsive to the calculated measurements. The processing control may output active feedback signals used to adjust the building of the vehicle or the setting of the alignment of wheels at an on-line or off-line facility based upon the measured compliance with a predetermined level of deviation from production standards.

In the preferred embodiment, the test station includes a wheel rotator for rotating the wheel about its spin axis. As used in this description, the term "wheel" is to be understood as referring to the wheel hub, rim, tire or any other attachments affixed to rotate with the wheel hub about a rotational axis. Although the work station may include a dynamometer roll test, for example, the type used in testing vehicle operation before it is released from the assembly facility, a preferred version of the test station includes a single or dual flat topped conveyor that carries the motor vehicle through a production assembly process.

In addition, the preferred embodiment also includes a non-contact sensor that does not interfere with production activity or with the alignment of components being measured by the sensor. The sensors may include visible or non-visible lasers, ultrasonic, microwave and LIDAR sensors. The sensors can be mounted on an indexing head and capable of translation in the vertical plane to permit measurement of differently sized wheels at multiple locations on the wheel, or to measure multiple wheels, for example, front and rear wheels on a vehicle, using one sensor.

In addition to computer processed mathematical algorithms used to calculate caster, camber and toe values from sensor-generated signals, the present invention employs statistical process control (SPC) techniques for process control and to identify vehicles with alignment parameters falling outside a predetermined standard deviation range. Preferably, a test standard within a 2 σ(2 standard deviations) range will be sufficient for maintaining existing production standards. The statistical data can also be used with the plant data network for real-time feedback control of the remote alignment setting machines or upstream vehicle build or alignment stations upon identification of a threshold compliance level below a predetermined level.

As a result, the present invention provides an automated system that does not require human intervention in order to monitor and identify each production vehicle and its compliance with wheel alignment specifications or production quality standards. In addition, the present invention provides the advantage of passive wheel alignment monitoring as the system provides no operator intervention, no interference with production activity and is performed at production speed. Furthermore, the present invention provides non-contact sensing that avoids interference with the actual vehicle setup during monitoring, and avoids the risk of improper installation, and the time for set-up of monitoring devices on the vehicles proceeding through the test station. Furthermore, the present invention provides auditing by statistical analysis previously unavailable on an entire production output. Accordingly, the method and apparatus of the present invention provide automatic, passive and no physical contact auditing of wheel alignments at production speed.

The present invention also includes analyses that provide automated identification of assignable causes to the alignment variations being experienced in production, and provides active feedback to adjust for improved production that will meet compliance with the desired level of standard deviations.

BRIEF DESCRIPTION OF THE DRAWING

The present invention will be more clearly understood by reference to the following detailed description of a preferred embodiment when read in conjunction with the accompanying drawing in which like reference characters refer to like parts throughout the views and in which.

BEST MODE FOR CARRYING OUT THE INVENTION

Figure 1:
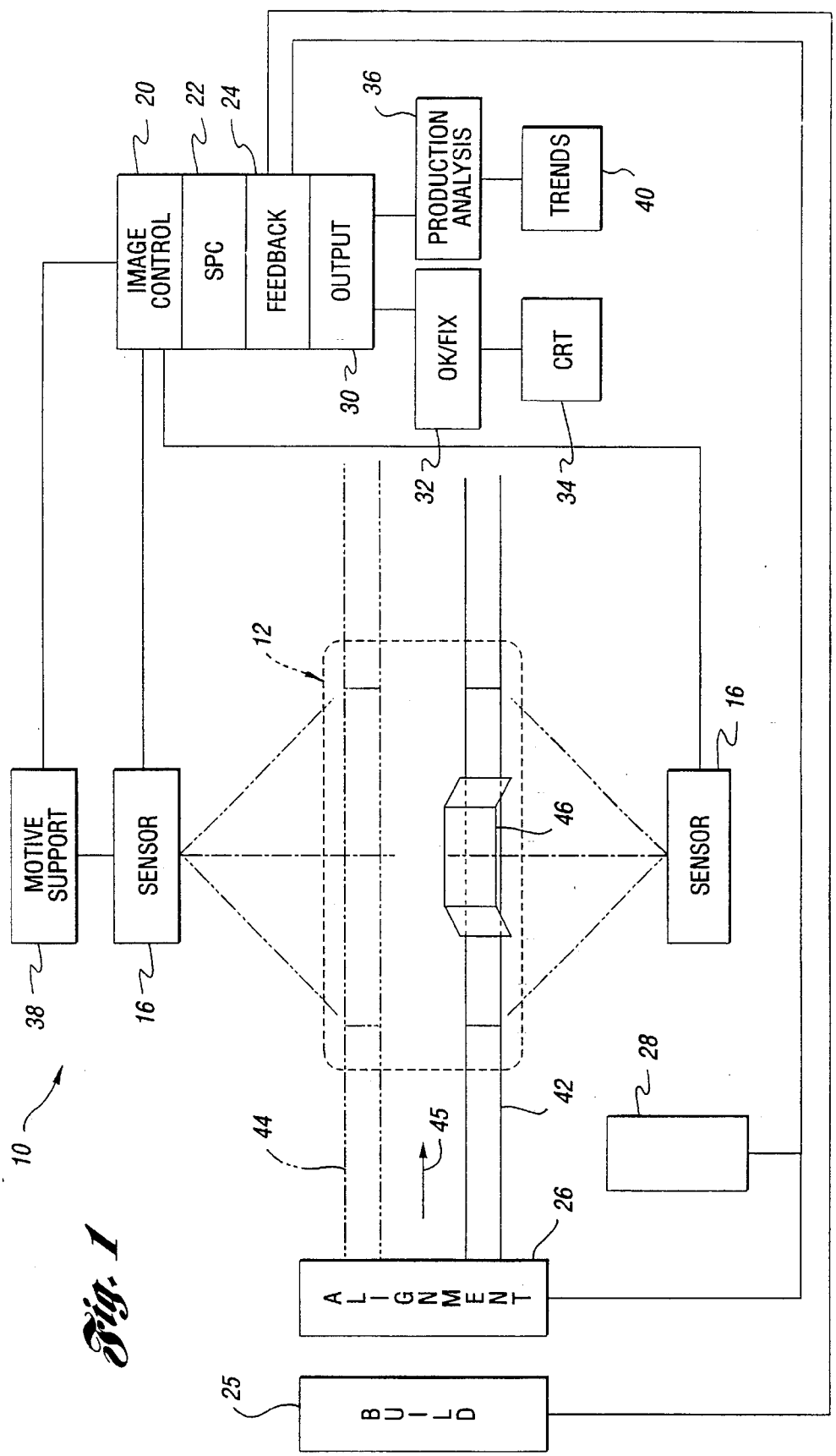
FIG. 1 is a schematic plan view of a wheel alignment auditing system according to the present invention.

Referring first to FIG. 1, a wheel alignment auditor 10 is there shown located at a test station 12 positioned along a production line 14. The test station is accompanied by at least one sensor 16 operated in conjunction with the image control computer 20. The image control computer 20 processes image data to obtain location coordinates processes algorithms for calculating measurements from the position coordinates to obtain the wheel alignment conditions of caster, camber and toe from the representative signals generated by the sensor 16. For example, the image control computer 20 may be provided with available programming such as Perceptron WheelWorks alignment algorithm software may be employed.

In addition, a programmed analyzer 22, for example, for processing statistical process control (SPC) techniques according to Ford RS1 software, to generate statistical data, is responsive to the calculated measurements of the vision computer 20. The analyzer 22 performs desired analyses, for example, $\bar{x}$ and R charts, with a substantially greater accumulation of data than can be obtained with previously known auditing apparatus. Accordingly, the mean of a standard deviation may be more accurately determined, and correlated with assignable causes in the build and alignment specifications.

The auditing system 10 preferably determines wheel alignment compliance with a predetermined level of standard deviation. The statistical process control then conveys information for feedback responsive to the calculated measurement through a feedback control 24 to a remote station. The remote station may be an on-line production station for build as shown at 25, an alignment station as shown at 26 or it may be an off-line repair facility 28. Other useful output 30 may be derived from the measurements and analysis conducted in the computers 20 and 22. For example, as shown at 32, a preferred output 32 will be an identification of the particular vehicle and its compliance condition. For example, if the alignment is within the level of standard deviation, an OK or fix designation can be determined at 32 and may be displayed by a designation on CRT monitor 34 providing an immediate indication to an operator. In addition, an output for plant production planning, for example, adjusting build specifications, as shown at 36, from identified assignable causes or plant selection of the acceptable level of standard deviation, can be arranged as shown at 36.

The station 12, shown in FIG. 1, diagrammatically displays a single strand conveyor shown in solid line at 42. The production line may also employ a double flat strand conveyor, the second strand being designated in phantom line at 44 in FIG. 1. However, in the single flat strand embodiment, the vehicle is propelled along the production line with the tires resting upon the moving strand. The test station 12 preferably includes a tire rotator to adjust for runout. As the vehicle passes the station 12 in the direction of the arrow 45 shown in FIG. 1, the wheels not resting upon the flat strand are rotating as the vehicle passes through the station 12. This rotation of the wheels enables the image control computer to adjust the image data for run-out. The run-out, due to inherent wheel wobble, can otherwise unduly affect the image data delivered from the scanner to the image control computer 20. Accordingly, the computer determines a run-out plane for adjusting the actual data obtained.

Since a complete alignment check requires that the wheels on both sides of the vehicle be monitored, the wheels resting on the moving strand 42 can be temporarily raised from the moving strand, for example, by the ramp extending over a portion of the strand 42 as diagrammatically indicated at 46. The raised vehicle tire is rotated as the vehicle passes through the scanning field of the scanner 16 while the vehicle is driven by contact of the other wheel with the strand. As a result, compensation for run-out by rotation of the wheels can be employed for the image data derived on both sides of the vehicle carried by a single strand conveyor.

Figure 3:
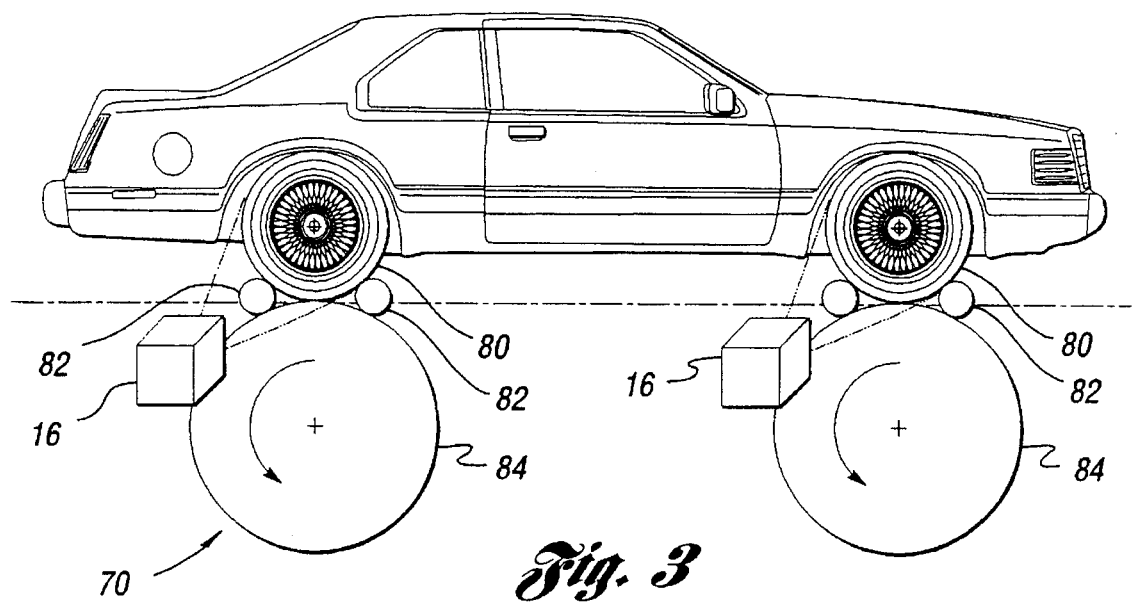
FIG. 3 is a diagrammatic view of an alternative test station for use in the system shown in FIG. 1.

Referring now to FIG. 3, the sensor 16 includes three scanners 48, for example, Perceptron Tricam CO 400 or CO 600 scanners, to provide a view plane 50 having height 52 and length 50. In the preferred embodiment, the scanners of the sensor 16 target three reference points for triangulation calculations that enable 3 dimensional data points to be obtained. The location data enables the characteristics of caster, camber and toe to be determined with reasonable accuracy.

Figure 2:
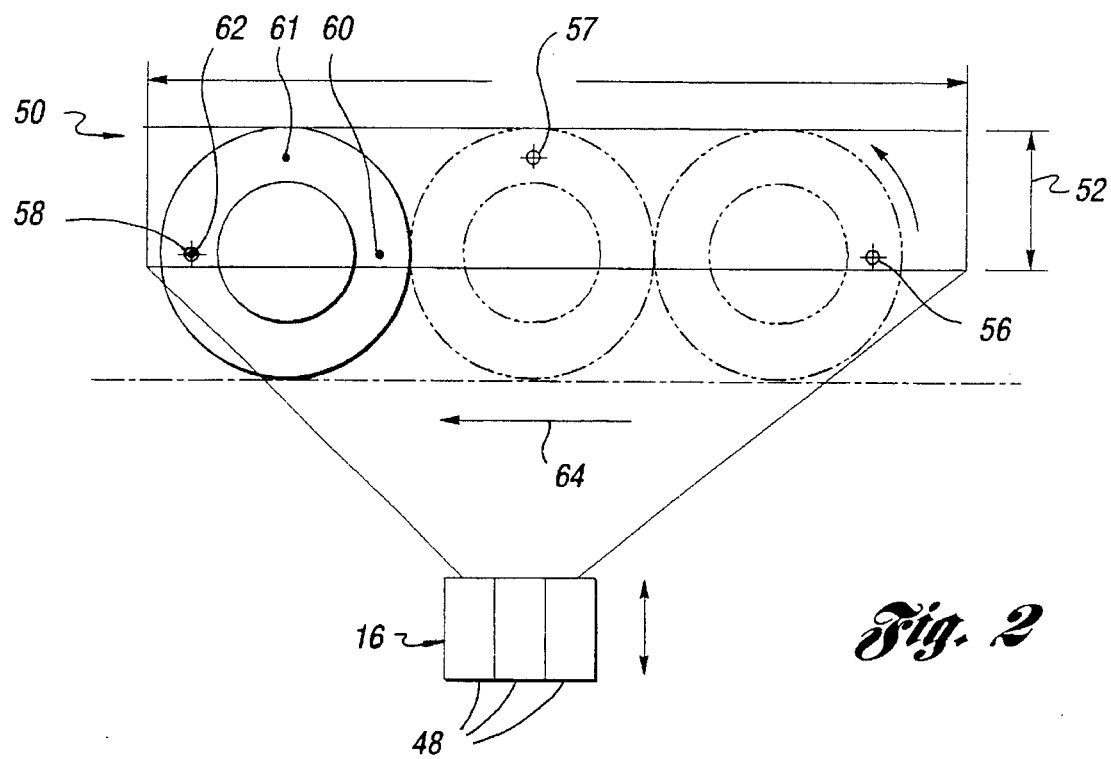
FIG. 2 is a diagrammatic view of scan fields that can be monitored by the sensors shown in FIG. 1.

The FIG. 3 illustration demonstrates two alternatives for targeting the three reference points. In one version, three sequential sensor readings are taken by the three scanners of a single rotated point on the tire as the tire rotates through the scanning field 50. For example, as the tires rotate from right to left as shown in FIG. 2, the three scanners 48 may be sequentially targeted at the points indicated by the marks 56, 57 and 58. Alternatively, three simultaneous sensor readings may be taken as shown by the solid dots at 60, 61 and 62 at the far left side of FIG. 2. In either event, the reference points are sampled at the sampling rate of the scanners in a Y configuration as illustrated by the target points 56–58 or 60–62.

As the sensor 16 measures the location of the target points, a data file of measurement "segments" is modelled by the computer software in the image computer 20. The computer 20 determines the run-out plane and compensates for the wobble as the tire rotates, to compile the measurements of the toe caster and camber. For example, the samples at targets points 60 and 62 enable the determination of toe, while the measurements taken at target point 61 with respect to the measurement of target points at 60 and 62 enable the camber to be readily determined. In addition, the caster can be extrapolated from changes in the measurements at the target points 60, 61 and 62 as the wheels are displaced about the pivot axis during measurement through the scanning field 50.

The sensors 16 may be reciprocated forward and rearward relative to the arrow 64 shown in FIG. 2 by the motive support 38 (FIG. 1) so that both the front and rear tire may be scanned by a single sensor 16 in the workstation 12. The expanded Y arrangement of the targets 56–58 and 60–62 is desired to provide accurate triangulation data at existing sampling speeds for laser scanners. Nevertheless, it is contemplated that substantially closer reference points could be used as laser scanning speeds improve. Moreover, while at least one sensor is required at station 12, and two are provided in the preferred embodiment, additional scanners may be provided, for example, one for each wheel.

The auditor 10 may include previously known alignment equipment, such as the sensors, controls, processors, and system discussed in U.S. Pat. No. 4,745,469 and incorporated by reference herein. In addition, several advantageous features of LIDAR (light radar) may be used as sensors in the method and apparatus of the present invention.

Alternatively, the vehicle may be carried on a flat belt double strand conveyor. Accordingly, the vehicle and the non-contact alignment (NCA) measurement heads supported by the sensor support 38 would displace the sensor 16 at the rate of the production line 14. In such an event, the NCA heads may cycle back for a rear axle audit after scanning the front wheel portion of the motor vehicle at test station 12.

In addition, the support 38 may be stationary with a single sensor 16 in the form of a LIDAR scanner on each side of the vehicle. Such a scanner may simultaneously cover both front and rear wheels. The LIDAR sensors provide a simultaneous range map representing the depth, or third, dimension of cartesian coordinates, and an intensity map representing the two-dimensional images of surfaces and objects in the scan field. The LIDAR beam source scans with a tightly focused beam of amplitude modulated light so that as the beam passes over the surfaces of objects, some of the light is scattered back to the LIDAR camera. However, the Y arrangement of 3 scanner targets may be avoided where a sensor, such as a LIDAR scanner measures both the brightness and the phase of the returning signal. For example, high-speed data acquisition, in the range of about 350 images per second, easily enables brightness to be measured to determine height and width dimensions by intensity calculation, and phase shift is used to calculate the depth or range of the images.

Referring now to FIG. 3, an alternative test station 12 is thereshown in the form of a dynamometer 70. With such a test station 12, the sensor 16 might be rigidly mounted and not require the movement previously discussed for the scanner support 38. In such an event, the wheels 80 are rotated upon support rollers 82 and in surface engagement with the test wheels 84. While the vehicle is not moving, the dynamometer test station 70 permits the vehicle wheel alignment to be tested at the time that the power train tests or other inspections are being accomplished. Nevertheless, the image computer 20 will provide measurements that can be used in statistical processing control as discussed with the FIG. 1 embodiment.

In any event, once the algorithms for statistical processing control have been processed, the apparatus is able to determine whether the vehicle tested is within the level of standard deviation selected as permissible. For example, in the preferred embodiment, a deviation within a level of 2 $\sigma$, i.e. twice the standard deviation, may be acceptable for purposes such as feedback signals that are used to initiate adjustment to production line fixtures or alignment stations. For example, the degree to which tie rod joints are threadably engaged on a tie rod end may be adjusted if a significant, pre-selected number of vehicles are determined to be outside the accepted 2 $\sigma$ level of deviation. Similarly, information may also be output by the feedback means to an off-line repair station independent of the production line 14, for example, to prepare an alignment system such as that shown in U.S. Pat. No. 4,745,469 and being employed in resetting the wheel alignment of the vehicle before release from the factory.

As a result, the present invention provides an auditor which generates statistics on production not previously available, permits readings to be taken at substantially higher rates (jobs per hour) than previously known in contact and off-line systems. For example, 60–90 jobs per hour may be possible where previous equipment would permit only 1–2 jobs per hour. As a result, the system of the present invention permits the acquisition of data not previously available because of the slow, laborious demands for obtaining the information of the vehicle alignment. As a result, the present invention provides expedited evaluation and control of the production process and a higher quality product output than was previously possible. Moreover, the present invention permits the installation of equipment to be adjusted as necessary without misguided readings available only from limited samples of the production output. Moreover, the system provides automated, passive, non-contact detection of the wheel alignment which does not affect the accuracy of the readings being obtained by the monitoring apparatus.

Having thus described the present invention, many modifications thereto will become apparent to those skilled in the art to which it pertains without departing from the scope and spirit of the present invention as defined in the appended claims.

What is claimed is:

1. A wheel alignment auditing apparatus for an installed motor vehicle wheel for monitoring conditions of caster, camber and toe-in comprising:

a test station positioned for serially addressing each of a plurality of motor vehicles proceeding from a production line, said test station having at least one rotator for rotating said vehicle wheels in said test station;

at least one sensor for passively detecting physical cartesian relationships of at least one wheel on said each motor vehicle, and generating a representative signal;

a programmed computer control for calculating measurements for at least one of said conditions from said representative signal; and a programmed analyzer for processing statistical process control (SPC) techniques to generate statistical data responsive to said measurements for identifying wheel alignment compliance with a predetermined level of standard deviation;

wherein said test station comprises a dual strand conveyer.

2. The invention as defined in claim 1 and further comprising:

a feedback control responsive to said calculated measurement for adjusting production machines for aligning said wheel when said analyzer identifies a predetermined level of variation from said predetermined level of deviation.

3. The invention as defined in claim 1 wherein said at least one sensor comprises a light source sensor.

4. The invention as defined in claim 3 wherein said sensor comprises a laser beam sensor.

5. The invention as defined in claim 3 wherein said sensor comprises a LIDAR sensor.

6. The invention as defined in claim 1 wherein said at least one sensor comprises a microwave sensor.

7. The invention as defined in claim 1 wherein said at least one sensor comprises an ultrasonic sensor.

8. The invention as defined in claim 1 wherein said test station comprises a dynamometer roll test station.

9. The invention as defined in claim 1 and further comprising an automated displacement support for said sensor.

10. A method for auditing motor vehicle wheel alignment comprising:

rotating a motor vehicle mounted wheel at a test station;

passively sensing physical cartesian relationships of said motor vehicle wheel as it rotates and generating a responsive signal for each sensed relationship;

calculating a measurement for at least one of said conditions from said responsive signal;

processing statistical process control techniques including identifying a tested vehicle wheel's compliance with a predetermined level of standard deviation;

calculating a first output for communicating a particular vehicle compliance condition at a production line work station; and determining a production analysis for selecting said predetermined level of standard deviation.

11. The invention as defined in claim 10 wherein said method comprises adjusting equipment for a subsequently produced vehicle wheel by signalling a feedback signal from said processing.

12. The invention as defined in claim 10 wherein said rotating step comprises transferring said motor vehicle along a conveyor strand.

13. A wheel alignment auditor for motor vehicle production comprising:

a passive test station on a production line for serially addressing each of the production vehicles;

a non-contact sensor for passively detecting physical cartesian relationships of caster, camber and toe-in, and generating a representative signal for each of said detected physical relationships;

a computer controlled calculator for determining measurements from said representative signals;

a processor for statistical process control techniques to generate statistical data responsive to said measurements for identifying compliance with a predetermined level of standard deviation;

an adjuster for realigning production specifications in response to identification of a threshold of compliance outside a predetermined level of compliance; and feedback control to a remote station off-line from said production line for repair of selected motor vehicles from production.

14. A wheel alignment auditing apparatus for an installed motor vehicle wheel for monitoring conditions of caster, camber and toe-in comprising:

a test station positioned for serially addressing each of a plurality of motor vehicles proceeding from a production line, said test station having at least one rotator for rotating said vehicle wheels in said test station;

at least one sensor for passively detecting physical cartesian relationships of at least one wheel on said each motor vehicle, and generating a representative signal;

a programmed computer control for calculating measurements for at least one of said conditions from said representative signal; and a programmed analyzer for processing statistical process control (SPC) techniques to generate statistical data responsive to said measurements for identifying wheel alignment compliance with a predetermined level of standard deviation;

wherein said at least one sensor comprises a LIDAR light source sensor.

15. A wheel alignment auditing apparatus for an installed motor vehicle wheel for monitoring conditions of caster, camber and toe-in comprising:

a test station positioned for serially addressing each of a plurality of motor vehicles proceeding from a production line, said test station having at least one rotator for rotating said vehicle wheels in said test station;

at least one sensor for passively detecting physical cartesian relationships of at least one wheel on said each motor vehicle, and generating a representative signal;

a programmed computer control for calculating measurements for at least one of said conditions from said representative signal; and a programmed analyzer for processing statistical process control (SPC) techniques to generate statistical data responsive to said measurements for identifying wheel alignment compliance with a predetermined level of standard deviation;

wherein said at least one sensor comprises a microwave sensor.

16. A wheel alignment auditing apparatus for an installed motor vehicle wheel for monitoring conditions of caster, camber and toe-in comprising:

a test station positioned for serially addressing each of a plurality of motor vehicles proceeding from a production line, said test station having at least one rotator for rotating said vehicle wheels in said test station;

at least one sensor for passively detecting physical cartesian relationships of at least one wheel on said each motor vehicle, and generating a representative signal;

a programmed computer control for calculating measurements for at least one of said conditions from said representative signal; and a programmed analyzer for processing statistical process control (SPC) techniques to generate statistical data responsive to said measurements for identifying wheel alignment compliance with a predetermined level of standard deviation; wherein said at least one sensor comprises an ultrasonic sensor.

* * * * *